(12) United States Patent
Jeng

(10) Patent No.: US 12,482,219 B2
(45) Date of Patent: Nov. 25, 2025

(54) RECONSTRUCTION OF OBSCURED OBJECTS IN SEGMENTATION MAPS

(71) Applicant: The Boeing Company, Arlington, VA (US)

(72) Inventor: Isaac M. Jeng, Seal Beach, CA (US)

(73) Assignee: The Boeing Company, Arlington, VA (US)

( * ) Notice: Subject to any disclaimer, the term of this patent is extended or adjusted under 35 U.S.C. 154(b) by 281 days.

(21) Appl. No.: 18/464,448

(22) Filed: Sep. 11, 2023

(65) Prior Publication Data

US 2025/0086929 A1    Mar. 13, 2025

(51) Int. Cl.
*G06V 10/46* (2022.01)
*G06T 3/60* (2006.01)
*G06T 5/50* (2006.01)
*G06V 10/26* (2022.01)

(52) U.S. Cl.
CPC .............. *G06V 10/46* (2022.01); *G06T 3/60* (2013.01); *G06T 5/50* (2013.01); *G06V 10/26* (2022.01); *G06T 2207/20221* (2013.01)

(58) Field of Classification Search
CPC .......... G06V 10/46; G06V 10/26; G06T 3/60; G06T 5/50; G06T 2207/20221
See application file for complete search history.

(56) References Cited

U.S. PATENT DOCUMENTS

| | | | | |
|---|---|---|---|---|
| 5,303,051 | A * | 4/1994 | Levesque | G08B 13/19602 348/241 |
| 6,462,768 | B1 * | 10/2002 | Oakley | G06T 5/50 348/31 |
| 2005/0232506 | A1 * | 10/2005 | Smith | G06T 7/136 382/254 |
| 2008/0270332 | A1 * | 10/2008 | Rudolf | G06F 18/2135 706/14 |
| 2024/0119700 | A1 * | 4/2024 | Olsen | G06V 10/26 |

* cited by examiner

*Primary Examiner* — Jonathan A Boyd
(74) *Attorney, Agent, or Firm* — Yee & Associates, P.C.

(57) ABSTRACT

Reconstructing a partially obscured elliptical antenna dish image is provided. An image of an antenna dish contour with an obscured section is received, and a centroid for use as an origin reference is determined. Indices are sequentially assigned to samples along the contour starting with a sample having zero polar angle according to the origin reference. Sets of randomly selected N samples along the contour are prepared and used to perform least squares fit (LSF) to determine a cost function for each set. Cost functions with LSF residuals below a specified threshold show good quality-of-fit. An ensemble mean of the cost functions with good quality-of-fit is calculated. Outlier samples are identified according to local extrema for the ensemble mean. Samples having poor quality-of-fit of the ensemble mean between the extrema are considered outliers. Inlier samples are used to reconstruct the obscured section of the contour.

20 Claims, 13 Drawing Sheets

FIG. 5
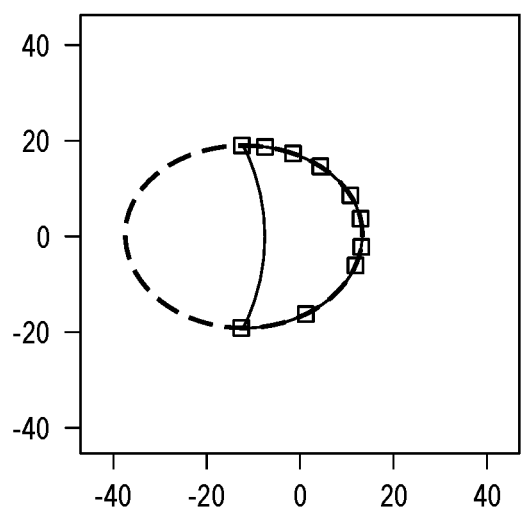
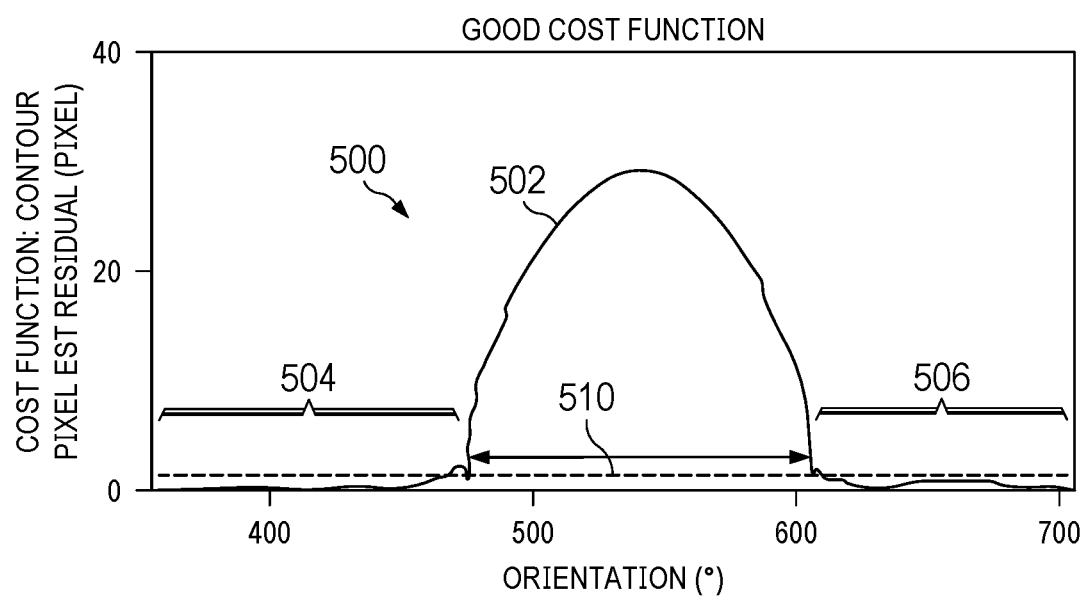

FIG. 6
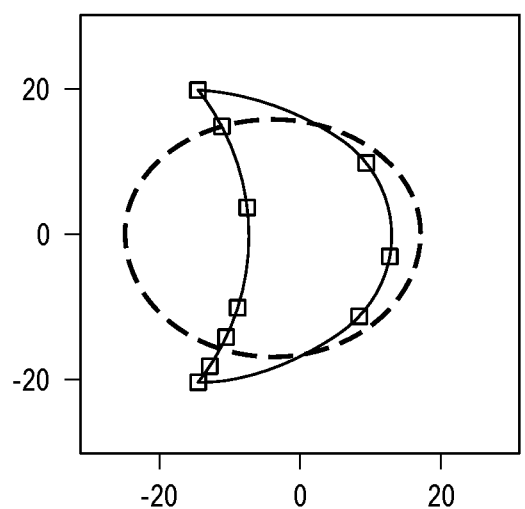
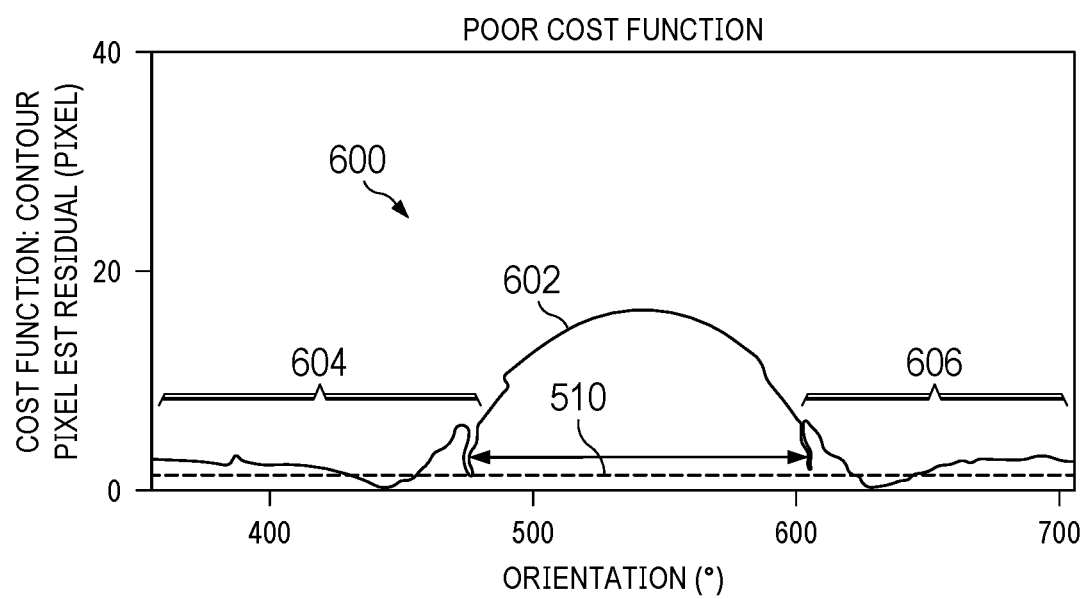

RECONSTRUCTION OF OBSCURED OBJECTS IN SEGMENTATION MAPS

BACKGROUND INFORMATION

Technical Field

The present disclosure relates generally to image reconstruction, and more specifically to reconstructing partially obscured segments of antenna dishes and solar panels.

Background

An ellipse is often taken from an image containing objects such as antenna dishes which are part of, e.g., a satellite in space, a stationary building, a mobile vehicle on land, or a marine vessel at sea, etc. An obscure ellipse object often exists in such images which the object is obscured by another object at the angle or orientation at which the image is taken.

A parallelogram object is often taken from an image containing objects like solar panels which might be a part of, e.g., a satellite in space, a stationary building, a mobile vehicle on land, or a marine vessel at sea, etc. An obscure parallelogram object often exists in such images which the object is obscured by another object at the angle or orientation at which the image is taken.

SUMMARY

An illustrative embodiment provides a computer-implemented method of reconstructing a partially obscured elliptical antenna dish image. The method comprises receiving an image of a contour of the elliptical antenna dish with an obscured section and determining a centroid of the contour for use as an origin reference. Indices are sequentially assigned to samples along the contour starting with a sample having zero polar angle according to the origin reference. A number of sets of randomly selected N samples along the contour are prepared, wherein N is a positive integer. Each set of N samples is used to perform least squares fit (LSF) to determine a cost function for each set. Quality-of-fit for each cost function is evaluated, wherein cost functions with LSF residuals below a specified threshold show good quality-of-fit. An ensemble mean of the cost functions with good quality-of-fit is calculated, and outlier samples are identified according to local extrema above a second specified threshold for the ensemble mean of the cost functions. All samples having poor quality-of-fit of the ensemble mean of the cost functions between the extrema are considered outliers. Inlier samples are then used to reconstruct the obscured section of the contour of the antenna dish.

Another illustrative embodiment provides a system for reconstructing a partially obscured elliptical antenna dish image. The system comprises a storage device that stores program instructions and one or more processors operably connected to the storage device and configured to execute the program instructions to cause the system to: receive an image of a contour of the elliptical antenna dish with an obscured section; determine a centroid of the contour for use as an origin reference; sequentially assign indices to samples along the contour starting with a sample having zero polar angle according to the origin reference; prepare a number of sets of randomly selected N samples along the contour, wherein N is a positive integer; use each set of N samples to perform least squares fit (LSF) to determine a cost function for each set; evaluate quality-of-fit for each cost function, wherein cost functions with LSF residuals below a specified threshold show good quality-of-fit; calculate an ensemble mean of the cost functions with good quality-of-fit; identify outlier samples according to local extrema above a second specified threshold for the ensemble mean of the cost functions, wherein all samples having poor quality-of-fit of the ensemble mean of the cost functions between the extrema are considered outliers; and use inlier samples to reconstruct the obscured section of the contour of the antenna dish.

Another illustrative embodiment provides a computer-implemented method of reconstructing a partially obscured parallelogram solar panel image. The method comprises receiving an image of a contour of the solar panel with an obscured section and determining centroid of the contour for use as an origin reference. Indices are assigned sequentially to samples along the contour starting with a sample having zero polar angle according to the origin reference. Pairwise Euclidian distances from each sample to all other samples are calculated. Samples representing a truss of the solar panel are removed, wherein the removed samples have a pairwise Euclidian distance below a specified threshold and are non-next-index samples. The image of the contour comprising remaining samples is flipped to form a second, counterpart image. The image of the contour comprising the remaining samples is combined with the second, counterpart image to produce a complete parallelogram representing the solar panel.

Another illustrative embodiment provides a system for reconstructing a partially obscured parallelogram solar panel image. The system comprises a storage device that stores program instructions and one or more processors operably connected to the storage device and configured to execute the program instructions to cause the system to: receive an image of a contour of the solar panel with an obscured section; determining centroid of the contour for use as an origin reference; sequentially assign indices to samples along the contour starting with a sample having zero polar angle according to the origin reference; calculate pairwise Euclidian distances from each sample to all other samples; remove samples representing a truss of the solar panel, wherein the removed samples have a pairwise Euclidian distance below a specified threshold and are non-next-index samples; diagonally flip the image of the contour comprising remaining samples to form a second, counterpart image; and combine the image of the contour comprising the remaining samples with the second, counterpart image to produce a complete parallelogram representing the solar panel.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 5 depicts a graph illustrating a cost function with good quality-of-fit in accordance with an illustrative embodiment;

FIG. 6 depicts a graph illustrating a cost function with poor quality-of-fit in accordance with an illustrative embodiment;

DETAILED DESCRIPTION

The illustrative embodiments recognize and take into account that an ellipse is often taken from an image containing object such as antenna dishes which are part of, e.g., a satellite in space, a stationary building, a mobile vehicle on land, or a marine vessel at sea, etc. An obscure ellipse object often exists in such images which the object is obscured by another object at the angle or orientation at which the image is taken.

The illustrative embodiments recognize and take into account that a parallelogram object is often taken from an image containing objects like solar panels which might be a part of, e.g., a satellite in space, a stationary building, a mobile vehicle on land, or a marine vessel at sea, etc. An obscure parallelogram object often exists in such images which the object is obscured by another object at the angle or orientation at which the image is taken.

The illustrative embodiments provide a method to reconstruct an obscured ellipse contour utilizing digital image processing. Least Squares Fit (LSF) is used to reconstruct an obscured ellipse. By applying LSF to a large number of sets of random samples along the visible contour, the process uses the cost function of these sets to identify outlier samples to exclude in reconstructing the obscured contour.

The illustrative embodiments also provide a method to reconstruct an obscured parallelogram utilizing digital image processing. The method uses narrow partial contour removal and a flip and combine process to identify and reconstruct an obscured parallelogram.

These reconstruction methods have several potential applications including autonomous vision and automatic identification and in fields including artificial intelligence (AI) and machine learning.

Figure 1:
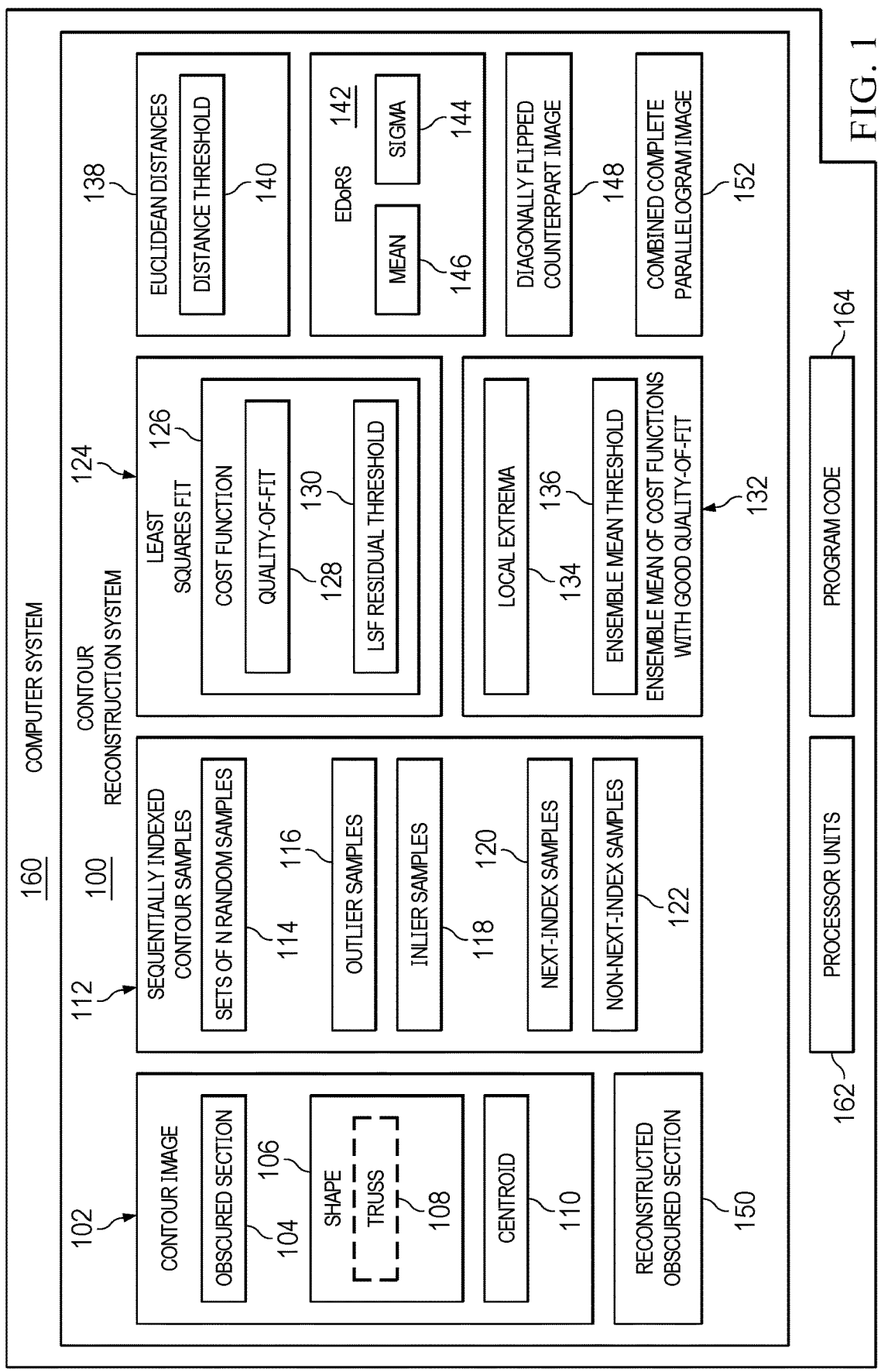
FIG. 1 is an illustration of a block diagram of a contour reconstruction system in accordance with an illustrative embodiment.

With reference now to FIG. 1, an illustration a block diagram of a contour reconstruction system is depicted in accordance with an illustrative embodiment.

Contour reconstruction system 100 receives a contour image 102 that has an obscured section 104. For example, the contour image 102 might be that of an antenna or a solar panel such as found on a satellite which is partially obscured by an object such as a corner of the satellite bus (see FIGS. 2 and 8).

The contour image 102 has an associated shape 106. For example, in the case of an antenna dish, the shape 106 might be elliptical, whereas in the case of a solar panel, the shape 106 might be parallelogram. In the case of a solar panel, the shape 106 might also include a truss 108 as part of the contour that is visible in the partially obscured view (see FIG. 9). Contour reconstruction system 100 can employ different reconstruction methods according to the geometry of shape 106.

Figure 3:
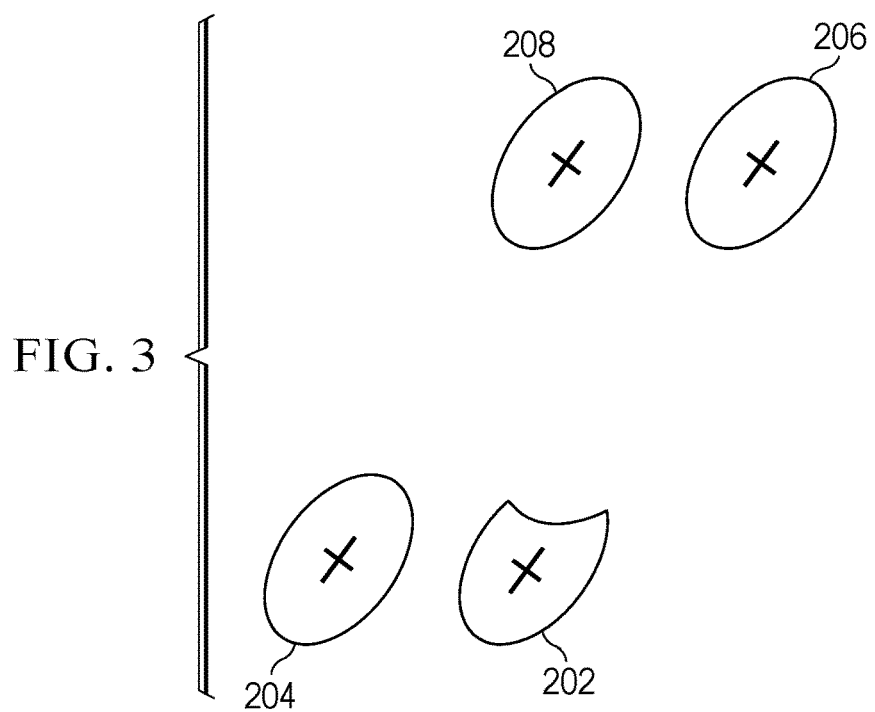
FIG. 3 depicts the elliptical antenna dishes of the satellite in isolation in accordance with an illustrative embodiment.

Contour reconstruction system 100 calculates the centroid 110 of the contour image 102 which serves as an origin reference in the analysis of the contour image to reconstruct the obscured section 104 (see FIG. 3).

Contour reconstruction system 100 sequentially indexes contour samples 112 along the contour lines visible in contour image 102. The sequence starts with a sample having zero polar angle according to the origin reference (centroid 110). These samples are positional data points along the contour (see FIGS. 4 and 9).

The sequentially indexed contour samples 112 can be divided into multiple (e.g., 100) sets of N random samples, where N is a positive integer. Contour reconstruction system 100 can perform a least squares fit (LSF) 124 for each of the sets of N random sample 114 to determine the respective cost function 126 for each set. Such an approach might be applied to a shape such as an ellipse of an antenna dish and applies the concept of RANSAC (Random Sample Consensus). Cost function 126 quantifies the difference between predicted values generated by the LSF 124 versus ground truth values. Cost function 126 measures how well LSF 124 performs. Minimizing the cost function 126 reveals the parameters that best fit the data and make the most accurate predictions.

A quality-of-fit 128 is evaluated for each set of N random samples 114 according to an LSF residual threshold 130. Cost functions having LSF residuals below the LSF residual threshold 130 are considered to show good quality-of-fit (see FIG. 5). Conversely, cost functions having an LSF residual above the LSF residual threshold 130 are considered to have poor quality-of-fit (see FIG. 6).

Figure 7:
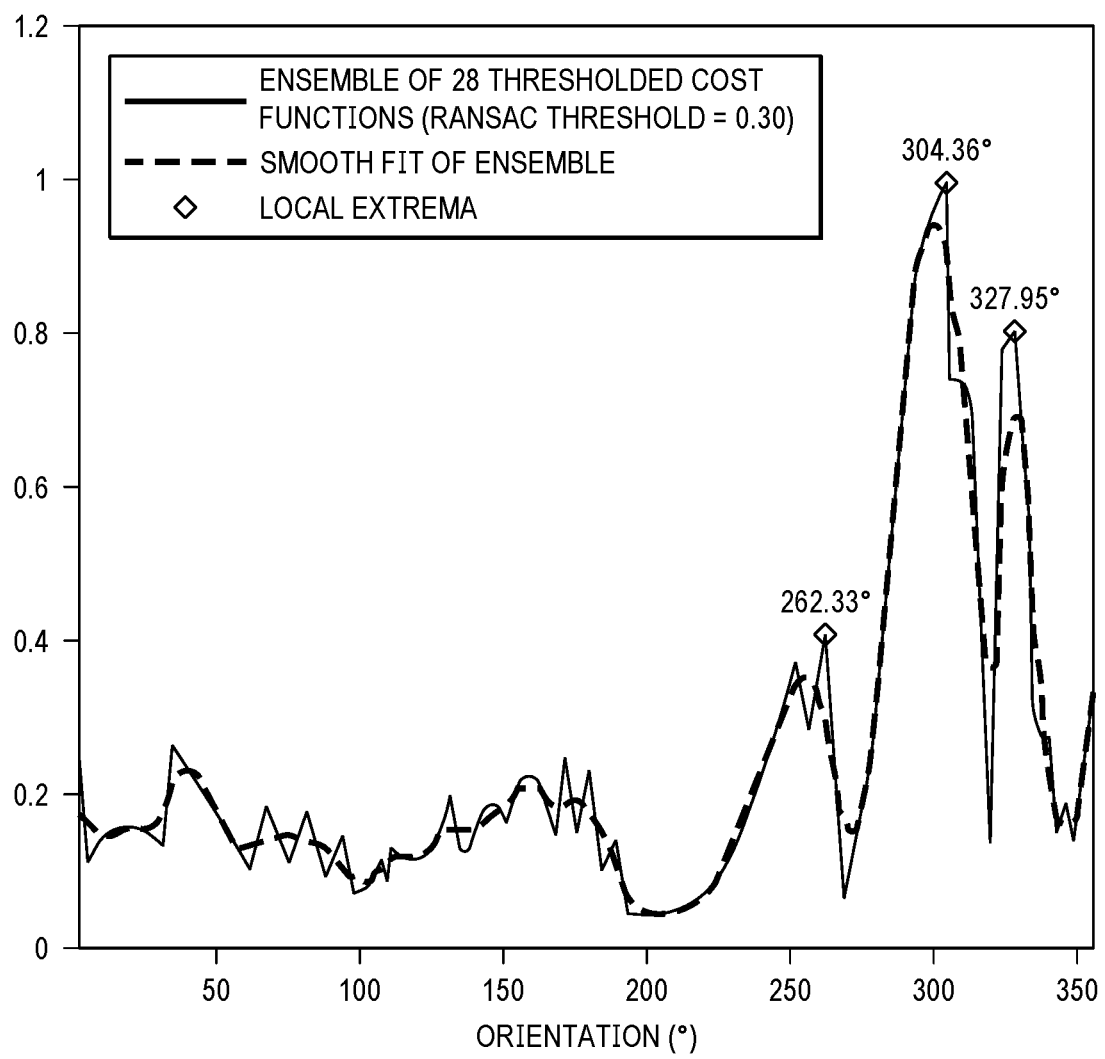
FIG. 7 depicts a graph illustrating an ensemble mean of cost functions with good quality-of-fit in accordance with an illustrative embodiment.

The cost functions showing good quality of fit can be used to calculate an ensemble mean 132 (see FIG. 7). This ensemble mean 132 of cost functions with good quality-of-fit might include several local extrema 134. Contour reconstruction system 100 can identify outlier samples 116 among the sequentially indexed contour samples 112 according to these local extrema 134. Contour reconstruction system 100 identifies local extrema 134 that exceed a specified ensemble mean threshold 136. All samples having poor quality-of-fit located between these local extrema 134 exceeding the ensemble mean threshold 136 are considered outlier samples 116. Such outliers are likely to be samples taken from the obscured section 104 of the contour image 102 and are therefore to be excluded when reconstructing the obscured section 104. After identification of the outlier samples 116, the remaining samples among the sequentially indexed contour samples can be considered inlier samples 118, which are used to generate a reconstructed obscured section 150 of the contour of the ellipse.

In the case where the contour image 102 has a shape 106 that is parallelogram, such as for a solar panel, contour reconstruction system 100 can employ a different set of calculations. In such a case, contour reconstruction system 100 can calculate pairwise Euclidean distances 138 from each sample to all of the other of the sequentially indexed contour samples 112. As mentioned above, in the case of a solar panel the shape 106 of the contour image 102 might include a truss 108 (see FIG. 9). Therefore, when trying to construct a complete image of the partially obscured solar panel, it is necessary to remove the contour samples that represent the truss 108.

The sequentially indexed contour samples 112 may be next-index samples 120 and non-next-index samples 122. Next-index samples are samples whose sequentially indices are consecutive, and non-next-index samples are samples whose sequential indices are not consecutive. There is at least one pass to remove sample representing a truss 108 of the solar panel sequentially indexed contour samples 112 identifies samples that are non-next-index samples 112 with Euclidean distances 138 below a specified distance threshold 140 (see FIG. 10). This is the completion of the first pass.

There may be a need for the second pass to remove the samples representing a truss left behind by the first pass. With those truss samples removed in the first pass, contour reconstruction system 100 calculates Euclidean distances of residual samples (EDoRS) 142. The EDoRS 142 are calculated for each residual sample (those samples left after removal of the truss samples in the first pass) to all other residual samples. Contour reconstruction system 100 calculates a mean 144 and sigma (sum) 146 of the EDoRS 142 and compares them. Contour reconstruction system 100 determines whether the sigma 146 of EDoRS 142 is greater than a multiple of the mean 144 (e.g., sigma>1.8 mean). If the sigma 146 is lower than this multiple of the mean 144, the second pass is not needed. The residual samples left behind after removal of the truss samples in the first pass are called remaining samples.

If the sigma 146 is greater than the specified multiple of the mean 144, the second pass is needed to remove the samples representing a truss left behind by the first pass. The contour reconstruction system 100 removes residual samples based on two criteria. The first criterion is that the residual samples are next-index samples 120. The second criterion is that these residual samples, whose indices are next-index, have a next-index sample Euclidean distance that is greater than a sum of a multiple of the sigma 146 and the mean 144 of the distances of all next-index residual samples (e.g., distance>3 sigma+mean). This calculation is the completion of the second pass. The residual samples left behind after the second pass are called remaining samples.

Contour reconstruction system 100 takes the contour image 102 comprising the remaining samples and diagonally flips it to form a counterpart image 148 that is essentially an image of the original contour image 102 after flipping across first the x-axis and then flipping again across the y-axis. Contour reconstruction system 100 can combine the diagonally flipped counterpart image 148 with the original contour image 102 comprising the remaining samples to produce a combined complete parallelogram image 152 representing the complete solar panel (see FIG. 11).

Contour reconstruction system 100 can be implemented in software, hardware, firmware, or a combination thereof. When software is used, the operations performed by contour reconstruction system 100 can be implemented in program code configured to run on hardware, such as a processor unit. When firmware is used, the operations performed by contour reconstruction system 100 can be implemented in program code and data and stored in persistent memory to run on a processor unit. When hardware is employed, the hardware can include circuits that operate to perform the operations in contour reconstruction system 100.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 160 is a physical hardware system and includes one or more data processing systems. When more than one data processing system is present in computer system 160, those data processing systems are in communication with each other using a communications medium. The communications medium can be a network. The data processing systems can be selected from at least one of a computer, a server computer, a tablet computer, or some other suitable data processing system.

As depicted, computer system 160 includes a number of processor units 162 that are capable of executing program code 164 implementing processes in the illustrative examples. As used herein a processor unit in the number of processor units 162 is a hardware device and is comprised of hardware circuits such as those on an integrated circuit that respond and process instructions and program code that operate a computer. When a number of processor units 162 execute program code 164 for a process, the number of processor units 162 is one or more processor units that can be on the same computer or on different computers. In other words, the process can be distributed between processor units on the same or different computers in a computer system. Further, the number of processor units 162 can be of the same type or different type of processor units. For example, a number of processor units can be selected from at least one of a single core processor, a dual-core processor, a multi-processor core, a general-purpose central processing unit (CPU), a graphics processing unit (GPU), a digital signal processor (DSP), or some other type of processor unit.

Figure 2:
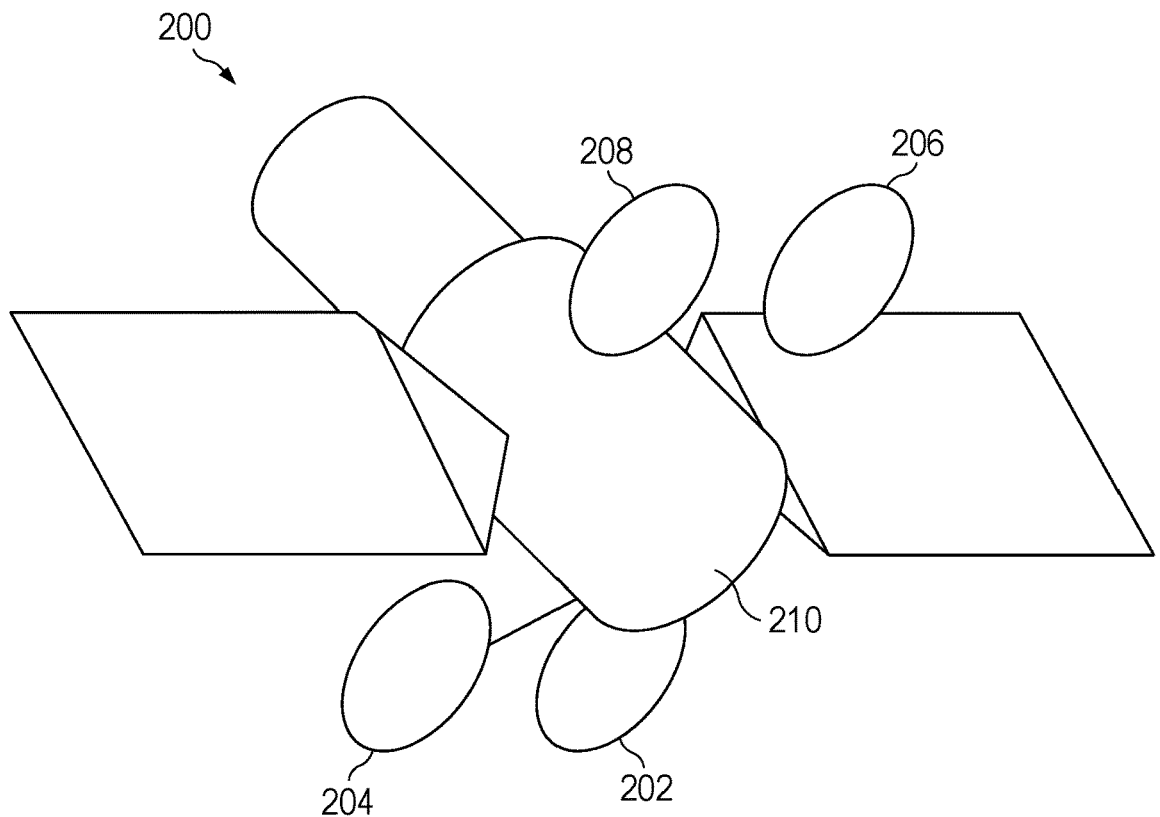
FIG. 2 depicts an illustration of a composite contour image of a satellite with a partially obscured antenna dish to which the illustrative embodiments can be applied.

FIG. 2 depicts an illustration of a composite contour image of a satellite with a partially obscured antenna dish to which the illustrative embodiments can be applied.

In this example, satellite 200 includes four elliptical antenna dishes 202, 204, 206, 208. As pictured, the ellipse of antenna dish 202 is partially obscured by the bus 210 of satellite 200.

FIG. 3 depicts the elliptical antenna dishes of satellite 200 in isolation in accordance with an illustrative embodiment.

This view more clearly shows the partial ellipse of antenna dish 202. The X's in each of the antenna dishes 202, 204, 206, 208 indicates the respective centroids of the visible ellipses.

Figure 4:
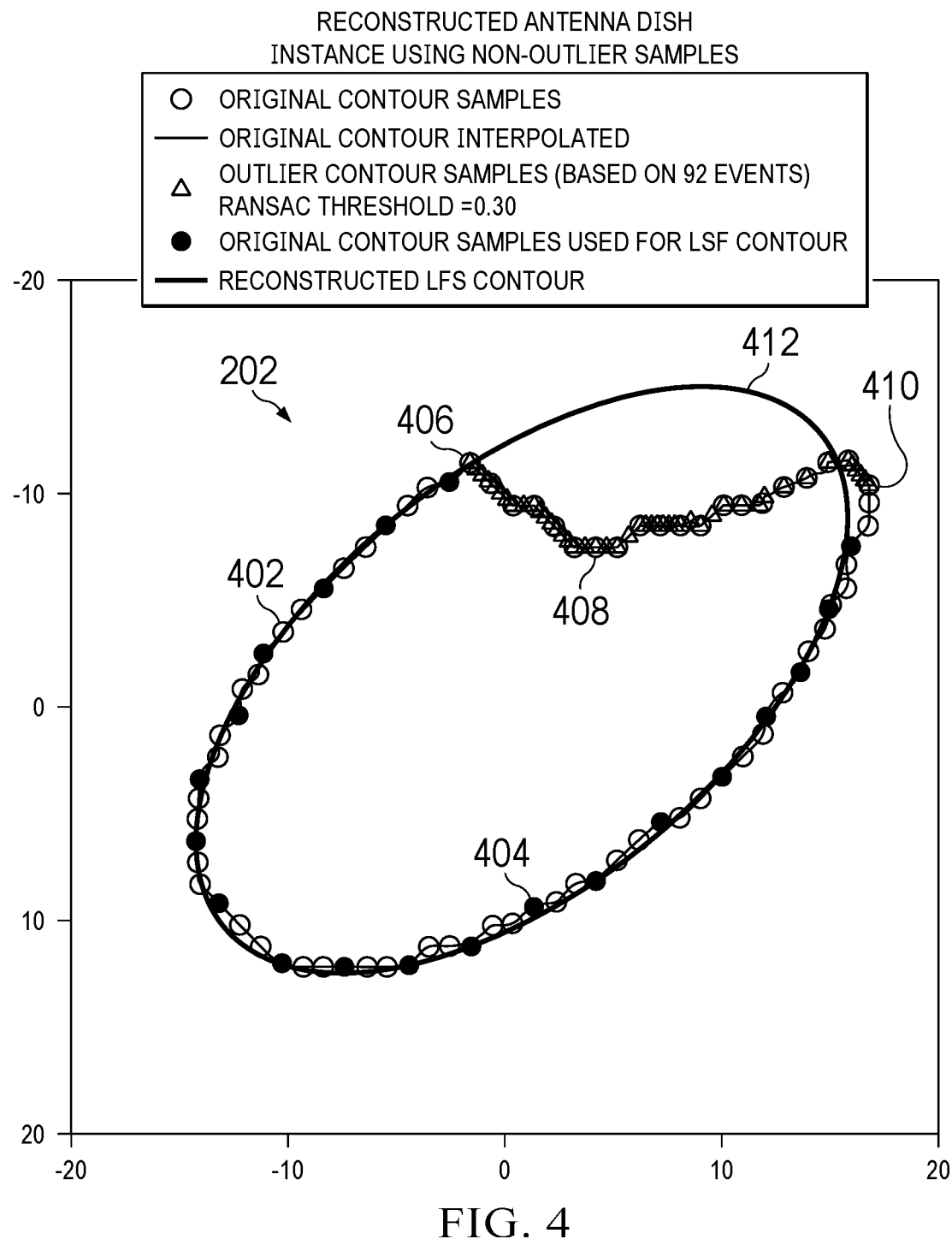
FIG. 4 depicts the partially obscured antenna dish ellipse with sequentially indexed samples along the contour in accordance with an illustrative embodiment.

FIG. 4 depicts the partially obscured antenna dish ellipse 202 with sequentially indexed samples along the contour in accordance with an illustrative embodiment. FIG. 4 illustrates the relationship of the sequentially indexed samples along the contour that are chosen in order to reconstruct the obscure section of the ellipse.

Starting with the original sequentially indexed sample 402, the contour reconstruction system pares them down to the samples used for the LSF contour 404 according to the LSF analysis described above. The local extrema 406, 408, 410 define the contour where the outlier samples are located, which corresponds to the outline of the satellite bus corner that is partially obscuring the ellipse of the antenna dish.

After the selection of contour samples 404 and the removal of outlier samples located between extrema 406-410, the contour reconstruction system is able to reconstruct the obscured section 412 of the ellipse.

FIG. 5 depicts a graph illustrating a cost function with good quality-of-fit in accordance with an illustrative embodiment. In contrast, FIG. 6 depicts a graph illustrating a cost function with poor quality-of-fit.

In both figures, the central lobes 502, 602 of the cost functions represent poor quality-of-fit portions. The distinction between good quality-of-fit cost function 500 and poor quality-of-fit cost function 600 lies in the LSF residuals 504, 506, 604, 606 and whether they lie above or below the threshold 510.

FIG. 7 depicts a graph illustrating an ensemble mean of cost functions with good quality-of-fit in accordance with an illustrative embodiment. In the illustrated example, the smooth fit of the ensemble is based on 28 thresholded cost functions. The local extrema at 262.33°, 304.36°, and 327.95° correspond to local extrema 406, 408, 410 in FIG. 4, respectively. All contour samples in given orientation range of local extrema are considered as outliers and not used to calculate the reconstructed obscured section.

Figure 8:
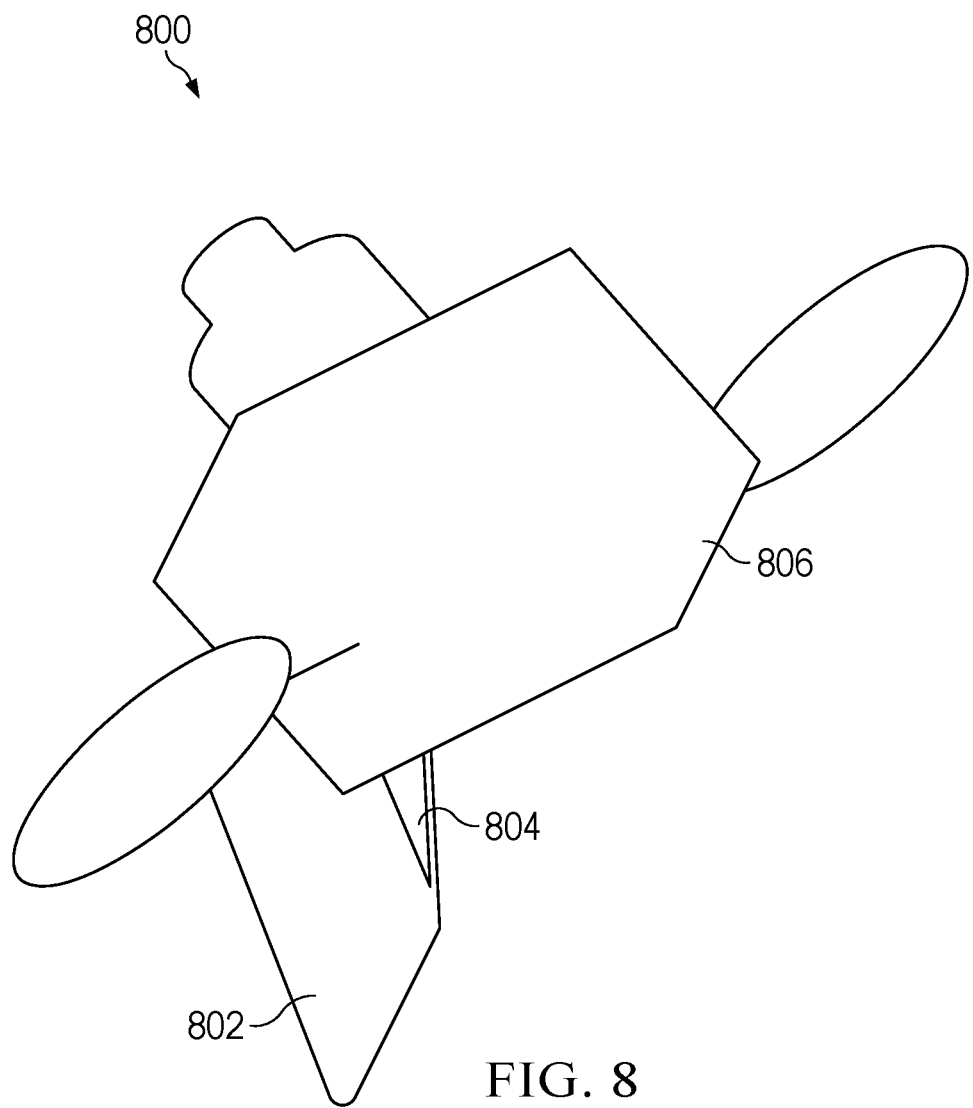
FIG. 8 depicts an illustration of a composite contour image of a satellite with a partially obscured solar panel to which the illustrative embodiments can be applied.

FIG. 8 depicts an illustration of a composite contour image of a satellite with a partially obscured solar panel to which the illustrative embodiments can be applied. In this example, satellite 800 includes a solar panel 802 which is partially obscure by a corner of the satellite bus 806.

Figure 9:
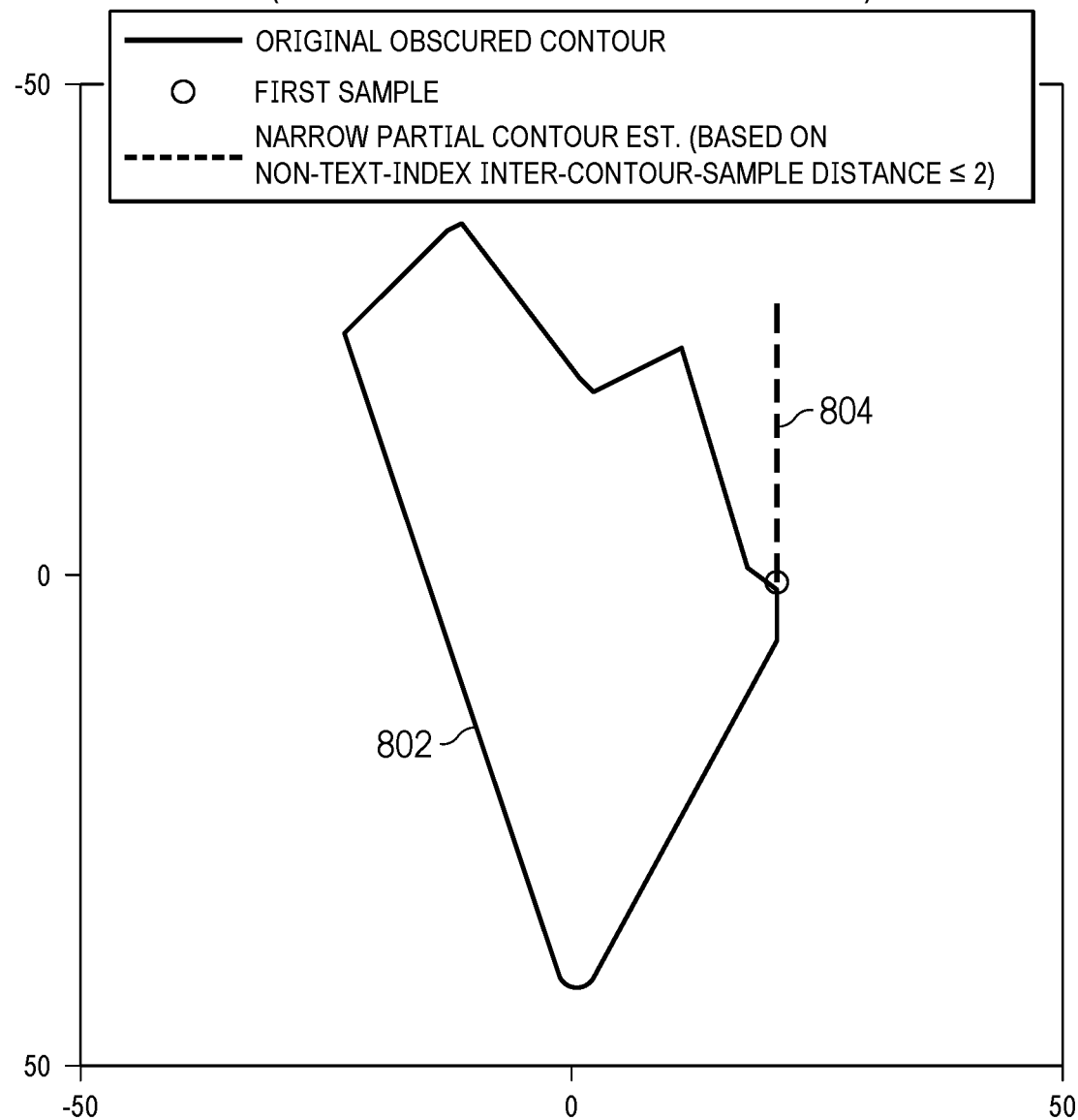
FIG. 9 depicts the partially obscured solar panel and truss in isolation.

FIG. 9 depicts the partially obscured solar panel 802 in isolation. In this view one can more clearly see the supporting truss 804 that makes up part of the contour outline of the solar panel 802.

Figure 10:
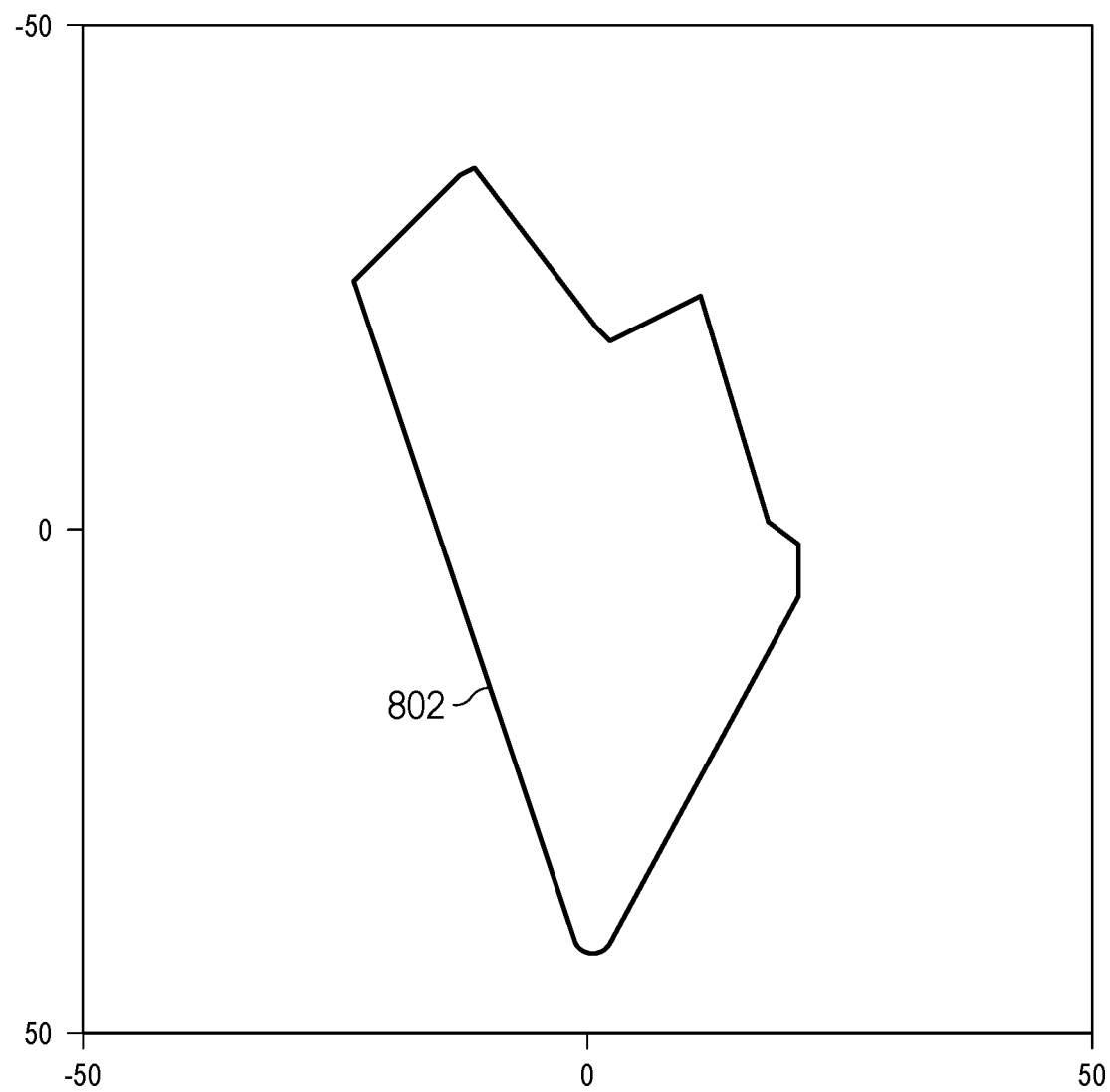
FIG. 10 depicts the partially obscured solar panel after removal of the truss from the contour image in accordance with an illustrative embodiment.

Narrow partial contour removal, described above, can be used to completely remove the truss 804 from the contour image, as shown in FIG. 10.

Figure 11:
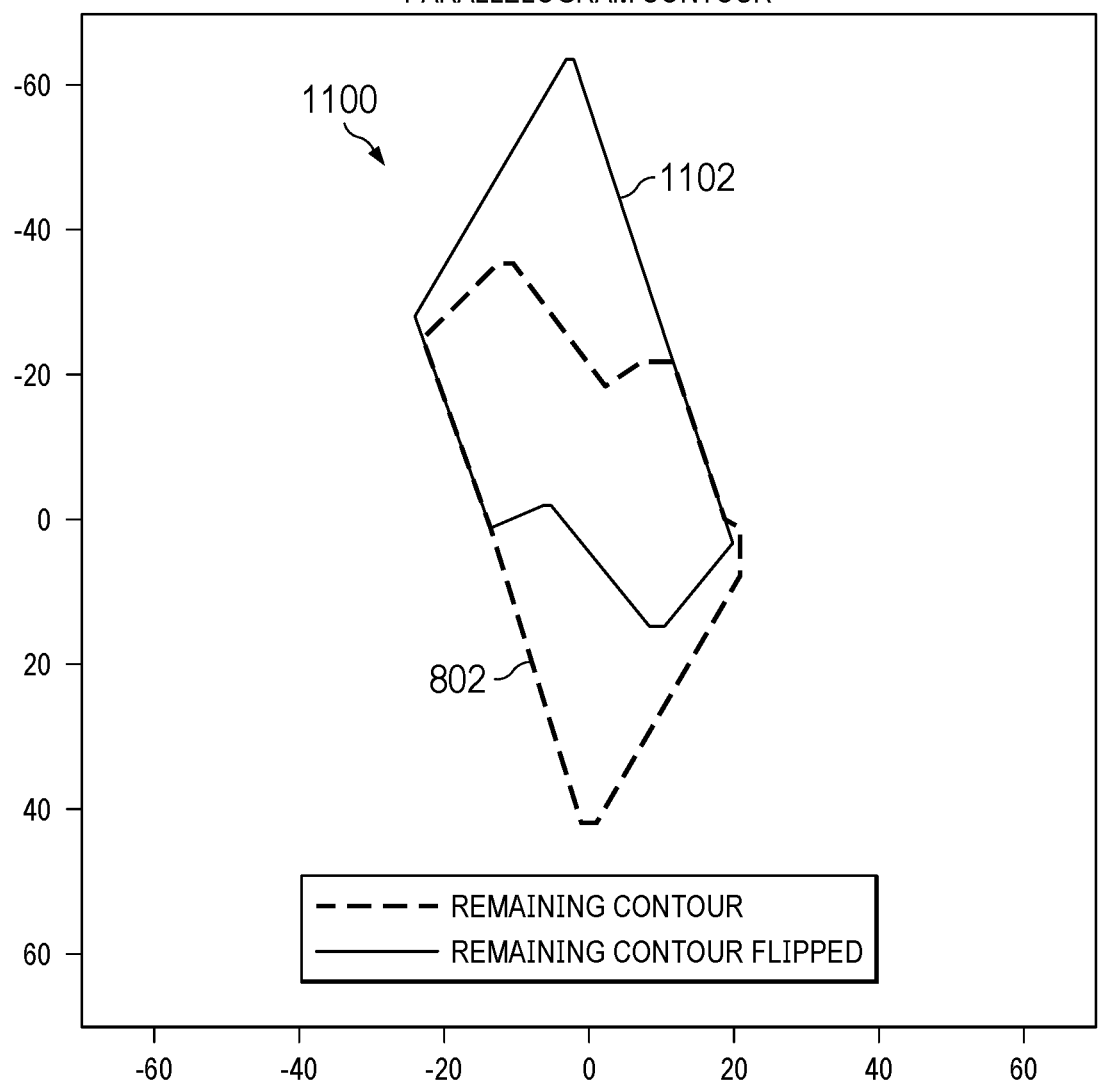
FIG. 11 depicts a reconstructed parallelogram contour in accordance with an illustrative embodiment.

FIG. 11 depicts a reconstructed parallelogram contour in accordance with an illustrative embodiment. After removal of the truss 804 from the original contour image of the partially obscured solar panel 802, the contour reconstruction system creates a diagonally flipped counterpart image 1102 of the partially obscured solar panel 802. The symmetry of the partial parallelograms of the original image and counterpart image allow them to be combined as shown in FIG. 11 to form a complete parallelogram contour 1100.

Figure 12:
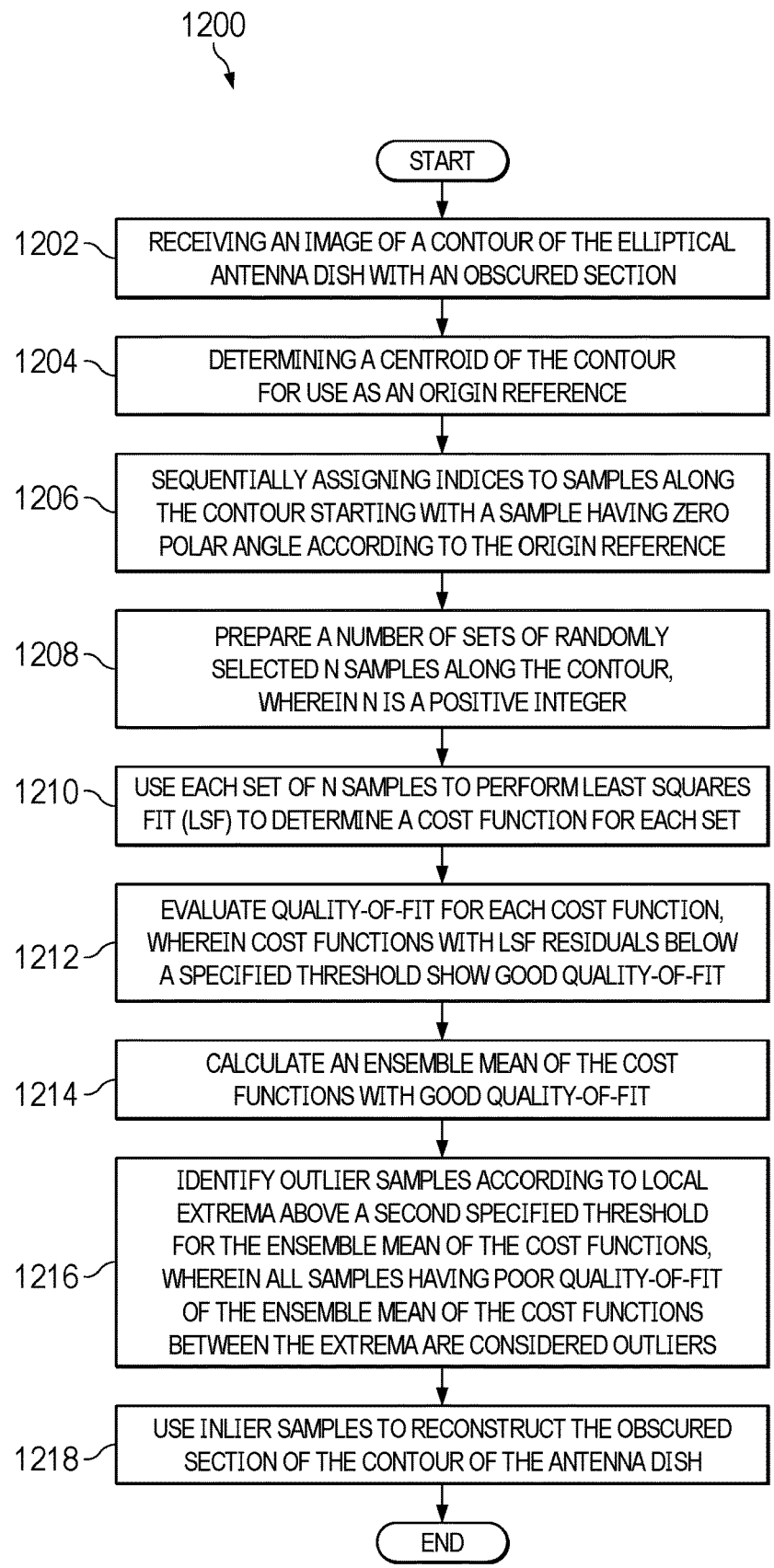
FIG. 12 depicts a flowchart of a process for reconstructing a partially obscured elliptical antenna dish instance in accordance with an illustrative embodiment.

FIG. 12 depicts a flowchart of a process for reconstructing a partially obscured elliptical antenna dish instance in accordance with an illustrative embodiment. Process 1200 can be implemented in hardware, software, or both. When implemented in software, the process can take the form of program code that is run by one or more processor units located in one or more hardware devices in one or more computer systems. For example, process 1200 can be implemented in contour reconstruction system 100 in FIG. 1.

Process 1200 begins by receiving an image of a contour of the elliptical antenna dish with an obscured section (operation 1202) and determining a centroid of the contour for use as an origin reference (operation 1204).

Process 1200 sequentially assigns indices to samples along the contour starting with a sample having zero polar angle according to the origin reference (operation 1206). Process 1200 then prepares a number of sets of randomly selected N samples along the contour, wherein N is a positive integer (operation 1208).

Process 1200 performs least squares fit (LSF) with each set of N samples to determine a cost function for each set (operation 1210) and evaluates quality-of-fit for each cost function (operation 1212). Each pair of samples among the N samples in a set might be at least four samples apart to avoid matrix singularity in the LSF process. Cost functions with LSF residuals below a specified threshold show good quality-of-fit. Process 1200 calculates an ensemble mean of the cost functions with good quality-of-fit (operation 1214).

Process 1200 identifies outlier samples according to local extrema above a second specified threshold for the ensemble mean of the cost functions (operation 1216). All samples having poor quality-of-fit of the ensemble mean of the cost functions between the extrema are considered outliers.

Process 1200 uses inlier samples to reconstruct the obscured section of the contour of the antenna dish (operation 1218). An output of the contour representing the elliptical antenna dish can be generated for use in determining relative attitude of an orbiting object including the elliptical antenna dish such as a satellite to enable rendezvous with the orbiting object for servicing. Process 1200 then ends.

Figure 13:
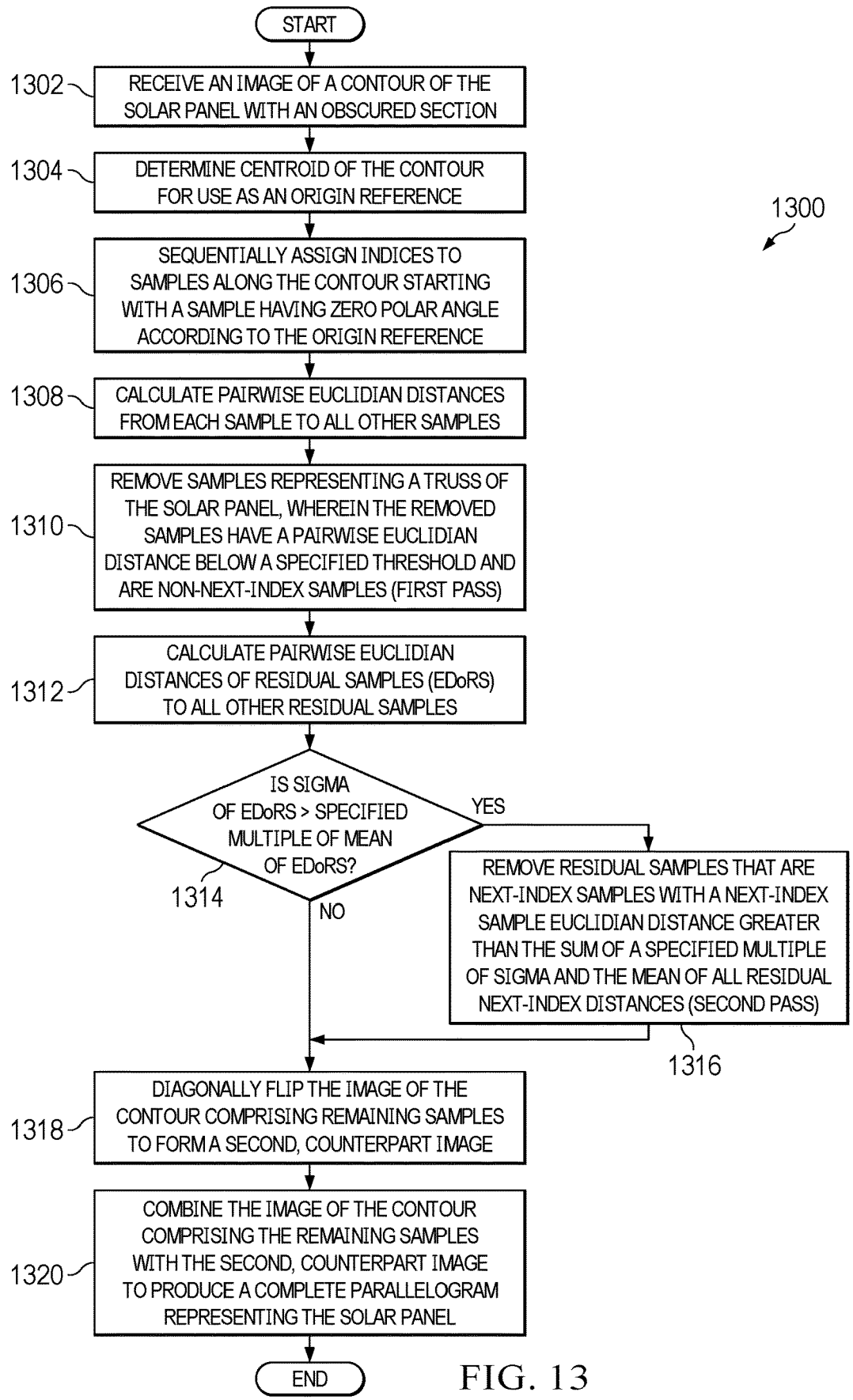
FIG. 13 depicts a flowchart of a process for reconstructing a partially obscured parallelogram solar panel instance in accordance with an illustrative embodiment.

FIG. 13 depicts a flowchart of a process for reconstructing a partially obscured parallelogram solar panel instance in accordance with an illustrative embodiment. Process 1300 can be implemented in hardware, software, or both. When implemented in software, the process can take the form of program code that is run by one or more processor units located in one or more hardware devices in one or more computer systems. For example, process 1300 can be implemented in contour reconstruction system 100 in FIG. 1.

Process 1300 begins by receiving an image of a contour of the solar panel with an obscured section (operation 1302) and determining centroid of the contour for use as an origin reference (operation 1304).

Process 1300 sequentially assigns indices to samples along the contour starting with a sample having zero polar angle according to the origin reference (operation 1306).

Process 1300 calculate pairwise Euclidian distances from each sample to all other samples (operation 1308).

Process 1300 identifies and removes samples representing a truss of the solar panel (operation 1310) by at least one pass, and possibly by a second pass. The removed samples representing the truss that have a pairwise Euclidian distance below a specified threshold (e.g., less than two pixels) and are non-next-index samples. This is the end of the first pass. If the second pass below is not needed, the residual samples are called remaining samples.

Process 1300 calculates pairwise Euclidian distances of residual samples (EDoRS) to all other residual samples (operation 1312).

Process 1300 determines whether a second pass is necessary by determining whether the sigma of the EDoRS is greater than a specified multiple (e.g., 1.8) of the mean of the EDoRS (operation 1314). Responsive to a determination that the sigma of the EDoRS is greater than the specified multiple of the mean of the EDoRS, process 1300 starts the second pass. For the second pass, process 1300 removes residual samples that are next-index samples with a next-index sample Euclidian distance greater than the sum of a specified multiple (e.g., 3) of the sigma and the mean of the distances of all next-index residual samples (operation 1316). Operation 1316 completes the second pass. The residual samples left behind after the second pass are called remaining samples.

Process 1300 then diagonally flips the image of the contour comprising the remaining samples to form a second, counterpart image (operation 1318) and combines the image of the contour comprising the remaining samples with the second, counterpart image to produce a complete parallelogram representing the solar panel (operation 1320). An output of the contour representing the solar panel can be generated for use in determining relative attitude of an orbiting object including the solar panel such as a satellite to enable rendezvous with the orbiting object for servicing Process 1300 then ends.

The flowchart and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware can, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 14:
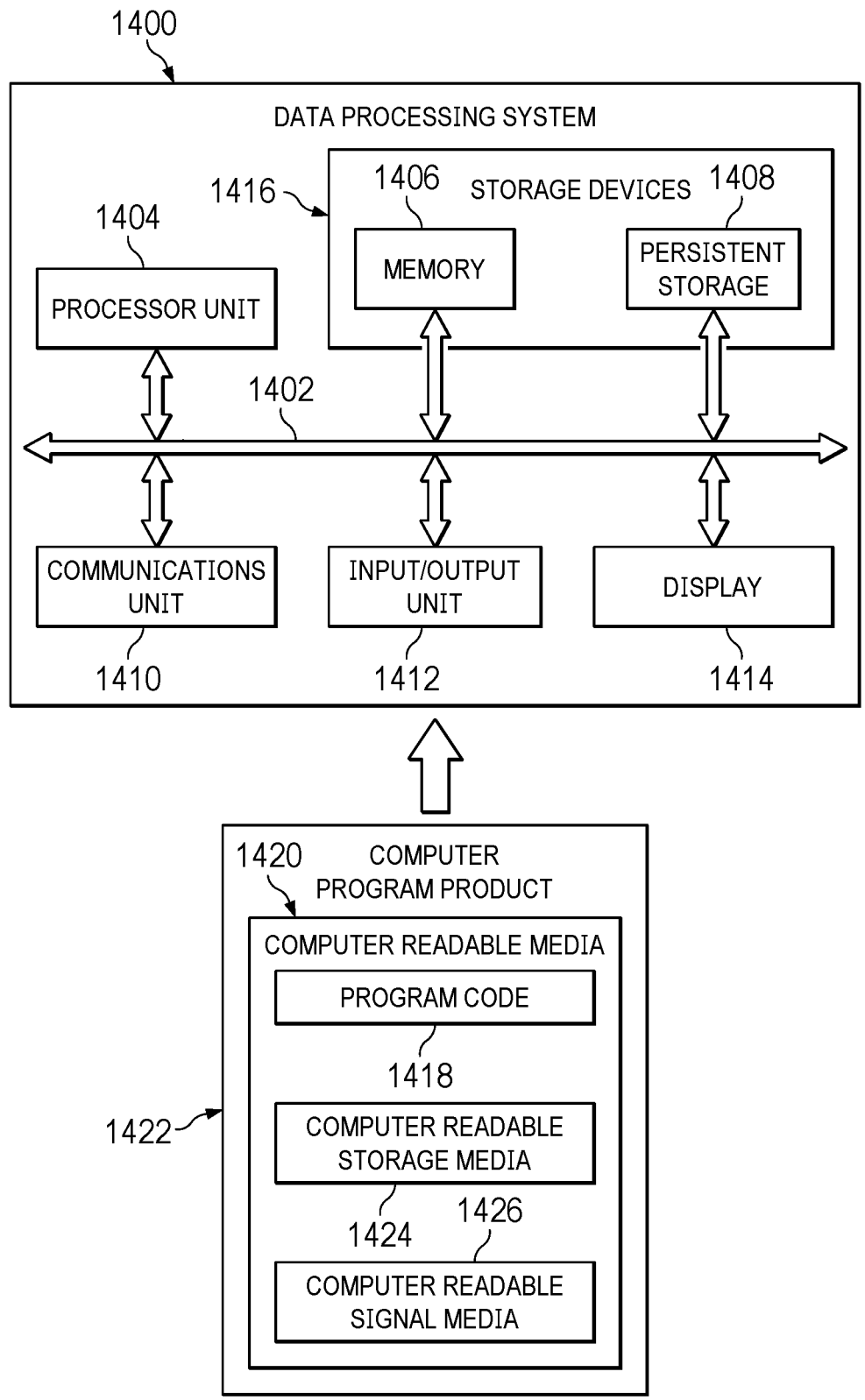
FIG. 14 is an illustration of a block diagram of a data processing system in accordance with an illustrative embodiment.

Turning now to FIG. 14, an illustration of a block diagram of a data processing system is depicted in accordance with an illustrative embodiment. Data processing system 1400 may be used to implement computer system 160 in FIG. 1. In this illustrative example, data processing system 1400 includes communications framework 1402, which provides communications between processor unit 1404, memory 1406, persistent storage 1408, communications unit 1410, input/output (I/O) unit 1412, and display 1414. In this example, communications framework 1402 takes the form of a bus system.

Processor unit 1404 serves to execute instructions for software that may be loaded into memory 1406. Processor unit 1404 may be a number of processors, a multi-processor core, or some other type of processor, depending on the particular implementation. In an embodiment, processor unit 1404 comprises one or more conventional general-purpose central processing units (CPUs). In an alternate embodiment, processor unit 1404 comprises one or more graphical processing units (GPUs).

Memory 1406 and persistent storage 1408 are examples of storage devices 1416. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1416 may also be referred to as computer-readable storage devices in these illustrative examples. Memory 1406, in these examples, may be, for example, a random access memory or any other suitable volatile or non-volatile storage device. Persistent storage 1408 may take various forms, depending on the particular implementation.

For example, persistent storage 1408 may contain one or more components or devices. For example, persistent storage 1408 may be a hard drive, a flash memory, a rewritable optical disk, a rewritable magnetic tape, or some combination of the above. The media used by persistent storage 1408 also may be removable. For example, a removable hard drive may be used for persistent storage 1408. Communications unit 1410, in these illustrative examples, provides for communications with other data processing systems or devices. In these illustrative examples, communications unit 1410 is a network interface card.

Input/output unit 1412 allows for input and output of data with other devices that may be connected to data processing system 1400. For example, input/output unit 1412 may provide a connection for user input through at least one of a keyboard, a mouse, or some other suitable input device. Further, input/output unit 1412 may send output to a printer. Display 1414 provides a mechanism to display information to a user.

Instructions for at least one of the operating system, applications, or programs may be located in storage devices 1416, which are in communication with processor unit 1404 through communications framework 1402. The processes of the different embodiments may be performed by processor unit 1404 using computer-implemented instructions, which may be located in a memory, such as memory 1406.

These instructions are referred to as program code, computer-usable program code, or computer-readable program code that may be read and executed by a processor in processor unit 1404. The program code in the different embodiments may be embodied on different physical or computer-readable storage media, such as memory 1406 or persistent storage 1408.

Program code 1418 is located in a functional form on computer-readable media 1420 that is selectively removable and may be loaded onto or transferred to data processing system 1400 for execution by processor unit 1404. Program code 1418 and computer-readable media 1420 form computer program product 1422 in these illustrative examples. In one example, computer-readable media 1420 may be computer-readable storage media 1424 or computer-readable signal media 1426.

In these illustrative examples, computer-readable storage media 1424 is a physical or tangible storage device used to store program code 1418 rather than a medium that propagates or transmits program code 1418. Computer readable storage media 1424, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 1418 may be transferred to data processing system 1400 using computer-readable signal media 1426. Computer-readable signal media 1426 may be, for example, a propagated data signal containing program code 1418. For example, computer-readable signal media 1426 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1400 are not meant to provide architectural limitations to the manner in which different embodiments may be implemented. The different illustrative embodiments may be implemented in a data processing system including components in addition to or in place of those illustrated for data processing system 1400. Other components shown in FIG. 14 can be varied from the illustrative examples shown. The different embodiments may be implemented using any hardware device or system capable of running program code 1418.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

As used herein, "a number of" when used with reference to items, means one or more items. For example, "a number of different types of networks" is one or more different types of networks. In illustrative example, a "set of" as used with reference items means one or more items. For example, a set of metrics is one or more of the metrics.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method of reconstructing a partially obscured elliptical antenna dish image, the method comprising:
   receiving an image of a contour of the elliptical antenna dish with an obscured section;
   determining a centroid of the contour for use as an origin reference;
   sequentially assigning indices to samples along the contour starting with a sample having zero polar angle according to the origin reference;
   preparing a number of sets of randomly selected N samples along the contour, wherein N is a positive integer;
   using each set of N samples to perform least squares fit (LSF) to determine a cost function for each set;
   evaluating quality-of-fit for each cost function, wherein cost functions with LSF residuals below a specified threshold show good quality-of-fit;
   calculating an ensemble mean of the cost functions with good quality-of-fit;
   identifying outlier samples according to local extrema above a second specified threshold for the ensemble mean of the cost functions, wherein all samples having poor quality-of-fit of the ensemble mean of the cost functions between the extrema are considered outliers; and
   using inlier samples to reconstruct the obscured section of the contour of the antenna dish.

2. The method of claim 1, further comprising generating an output of the contour representing the elliptical antenna dish for use in determining relative attitude of an orbiting object including the elliptical antenna dish to enable rendezvous with the orbiting object for servicing.

3. The method of claim 1, wherein each pair of samples among the N samples is a set is at least four samples apart.

4. The method of claim 1, wherein the outliers represent a structure that partially obscures the elliptical antenna dish.

5. A system for reconstructing a partially obscured elliptical antenna dish image, the system comprising:
   a storage device that stores program instructions;
   one or more processors operably connected to the storage device and configured to execute the program instructions to cause the system to:
   receive an image of a contour of the elliptical antenna dish with an obscured section;
   determine a centroid of the contour for use as an origin reference;
   sequentially assign indices to samples along the contour starting with a sample having zero polar angle according to the origin reference;
   prepare a number of sets of randomly selected N samples along the contour, wherein N is a positive integer;
   use each set of N samples to perform least squares fit (LSF) to determine a cost function for each set;

evaluate quality-of-fit for each cost function, wherein cost functions with LSF residuals below a specified threshold show good quality-of-fit;

calculate an ensemble mean of the cost functions with good quality-of-fit;

identify outlier samples according to local extrema above a second specified threshold for the ensemble mean of the cost functions, wherein all samples having poor quality-of-fit of the ensemble mean of the cost functions between the extrema are considered outliers; and use inlier samples to reconstruct the obscured section of the contour of the antenna dish.

6. The system of claim 5, wherein the processors further execute instructions to cause the system to generate an output of the contour representing the elliptical antenna dish for use in determining relative attitude of an orbiting object including the elliptical antenna dish to enable rendezvous with the orbiting object for servicing.

7. The system of claim 5, wherein each pair of samples among the N samples is a set is at least four samples apart.

8. The system of claim 5, wherein the outliers represent a structure that partially obscures the elliptical antenna dish.

9. A computer-implemented method of reconstructing a partially obscured parallelogram solar panel image, the method comprising:

receiving an image of a contour of the solar panel with an obscured section;

determining centroid of the contour for use as an origin reference;

sequentially assigning indices to samples along the contour starting with a sample having zero polar angle according to the origin reference;

calculating pairwise Euclidian distances from each sample to all other samples;

removing samples representing a truss of the solar panel, wherein the removed samples have a pairwise Euclidian distance below a specified threshold and are non-next-index samples;

diagonally flipping the image of the contour comprising remaining samples to form a second, counterpart image; and combining the image of the contour comprising the remaining samples with the second, counterpart image to produce a complete parallelogram representing the solar panel.

10. The method of claim 9, wherein removing samples representing a truss of the solar panel further comprises:

calculating pairwise Euclidian distances of residual samples (EDoRS) to all other residual samples; and responsive to a determination that the sigma of the EDoRS is greater than a specified multiple of the mean of the EDoRS, removing residual samples that are next-index samples with a next-index sample Euclidian distance greater than the sum of a specified multiple of the sigma and the mean of distances of all next-index residual samples.

11. The method of claim 10, wherein the multiple of the specified multiple of the mean of the EDoRS is 1.8.

12. The method of claim 10, wherein the multiple of the sigma is 3.

13. The method of claim 9, further comprising generating an output of the contour representing the solar panel for use in determining relative attitude of an orbiting object including the solar panel to enable rendezvous with the orbiting object for servicing.

14. The method of claim 9, wherein the specified threshold for pairwise Euclidian distance for removing samples is less than two pixels.

15. A system for reconstructing a partially obscured parallelogram solar panel image, the system comprising:

a storage device that stores program instructions;

one or more processors operably connected to the storage device and configured to execute the program instructions to cause the system to:

receive an image of a contour of the solar panel with an obscured section;

determining centroid of the contour for use as an origin reference;

sequentially assign indices to samples along the contour starting with a sample having zero polar angle according to the origin reference;

calculate pairwise Euclidian distances from each sample to all other samples;

remove samples representing a truss of the solar panel, wherein the removed samples have a pairwise Euclidian distance below a specified threshold and are non-next-index samples;

diagonally flip the image of the contour comprising remaining samples to form a second, counterpart image; and combine the image of the contour comprising the remaining samples with the second, counterpart image to produce a complete parallelogram representing the solar panel.

16. The system of claim 15, wherein, for removing samples representing a truss of the solar panel, the processors further execute instructions to cause the system to:

calculate pairwise Euclidian distances of residual samples (EDoRS) to all other residual samples; and responsive to a determination that the sigma of the EDoRS is greater than a specified multiple of the mean of the EDoRS, remove residual samples that are next-index samples with a next-index sample Euclidian distance greater than the sum of a specified multiple of the sigma and the mean of distances of all next-index residual samples.

17. The system of claim 16, wherein the multiple of the specified multiple of the mean of the EDoRS is 1.8.

18. The system of claim 16, wherein the multiple of the sigma is 3.

19. The system of claim 15, wherein the processors further execute instructions to cause the system to generate an output of the contour representing the solar panel for use in determining relative attitude of an orbiting object including the solar panel to enable rendezvous with the orbiting object for servicing.

20. The system of claim 15, wherein the specified threshold for pairwise Euclidian distance for removing samples is less than two pixels.

* * * * *